United States Patent [19]

Guinn et al.

[11] Patent Number: 5,042,639

[45] Date of Patent: Aug. 27, 1991

[54] LID ORIENTING MACHINE

[75] Inventors: Curtis Guinn; David E. Carson; Steven E. Corwine, all of Fort Collins; Kevin J. Anzek, Loveland, all of Colo.

[73] Assignee: Carson Burger Weekly, Inc., Fort Collins, Colo.

[21] Appl. No.: 560,078

[22] Filed: Jul. 30, 1990

[51] Int. Cl.$^5$ .................................... B65G 47/12
[52] U.S. Cl. .................... 198/443; 198/415; 198/454; 221/168; 221/203
[58] Field of Search .......... 198/392, 396, 415, 803.16, 198/454, 443; 221/167, 168, 202, 203

[56] References Cited

U.S. PATENT DOCUMENTS

| | | | |
|---|---|---|---|
| 2,771,981 | 11/1956 | McKune | 198/803.16 X |
| 2,778,478 | 1/1957 | Brook | 198/443 |
| 3,734,268 | 5/1973 | Burger et al. | 198/380 |
| 3,960,293 | 6/1976 | Sweet, II et al. | 221/167 X |
| 4,007,854 | 2/1977 | Ervine | 198/392 X |
| 4,138,009 | 2/1979 | Strong | 198/396 |
| 4,266,653 | 5/1981 | Mergl | 198/396 X |
| 4,379,504 | 4/1983 | Sqlicini | 221/168 X |
| 4,401,203 | 8/1983 | McDonald et al. | 198/396 X |
| 4,699,261 | 10/1987 | Nesin | 198/396 X |
| 4,711,338 | 12/1987 | Carson et al. | 198/396 |

Primary Examiner—Robert P. Olszewski
Assistant Examiner—Cheryl L. Gastineau
Attorney, Agent, or Firm—Hovey, Williams, Timmons & Collins

[57] ABSTRACT

An apparatus for handling a plurality of lids or other thin objects having two discrete sides, such as a top and bottom, for delivering then in a common orientation includes a conveyor for carrying the lids along the apparatus from an inlet end to a discharge end and an air jet nozzle which directs compressed air to engage at least some of the lids to shift them to an opposing angle of inclination. The conveyor includes orienting belts which are directed over rollers and pulleys whereby the lids, after at least some have been shifted, are returned to a substantially horizontal position when delivered at the discharge end. Two sets of orienting bells are supported by the rollers and pulleys to effect a V-shaped support adjacent the air jet nozzle so that the lids are supported in either alternate opposing angle of repose. The air jet nozzle may alternatively operate continuously or be actuatable by an electric eye whereby discrete jets of air may be directed toward the lip of a lid to thereby orient it. A metering belt upstream of the conveyor serves to advance the lids individually to the conveyor. A pair of rotatable descrambling disks serve to separate the lids for handling by the conveyor.

6 Claims, 3 Drawing Sheets

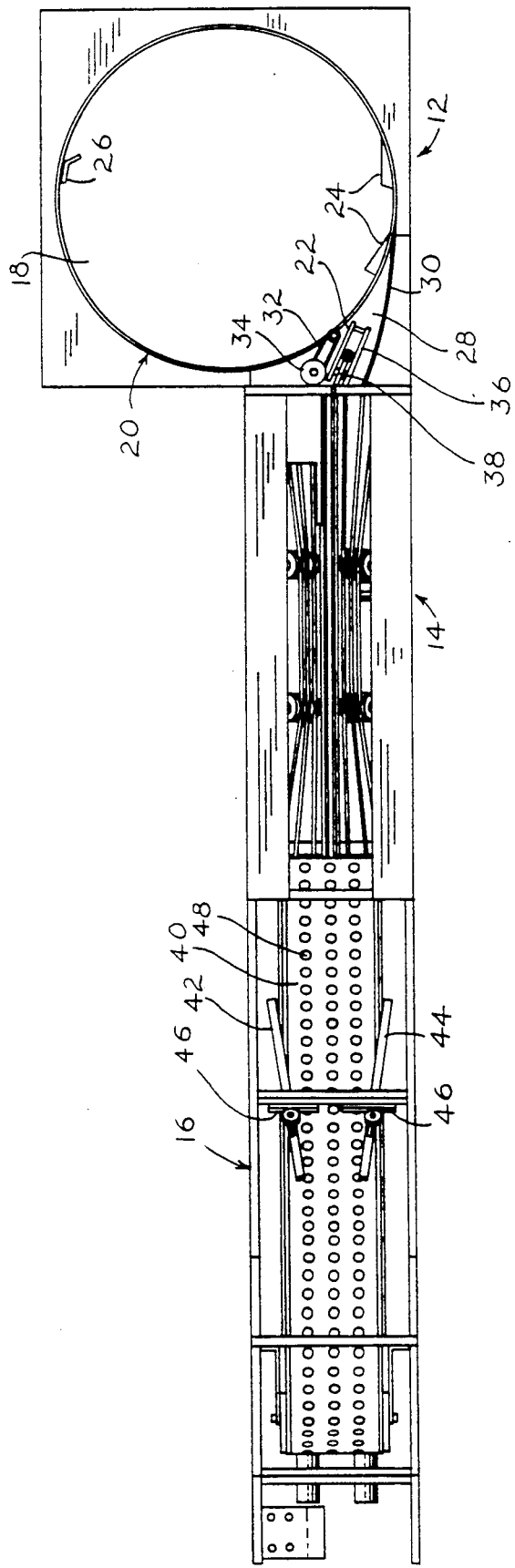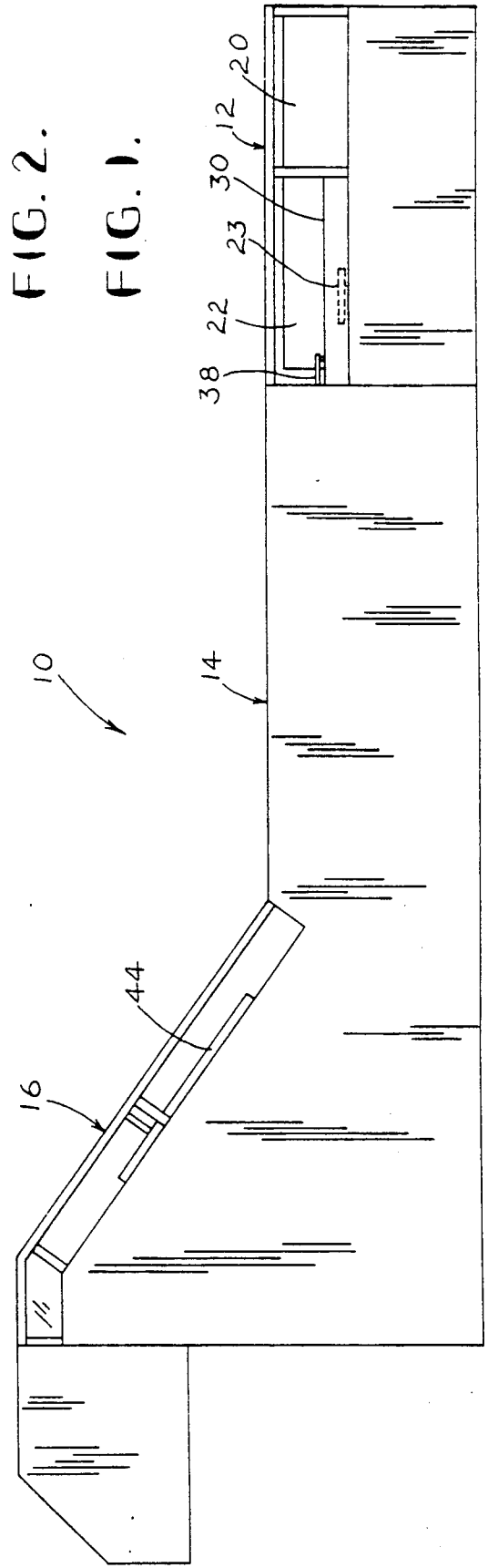
FIG. 2.
FIG. 1.

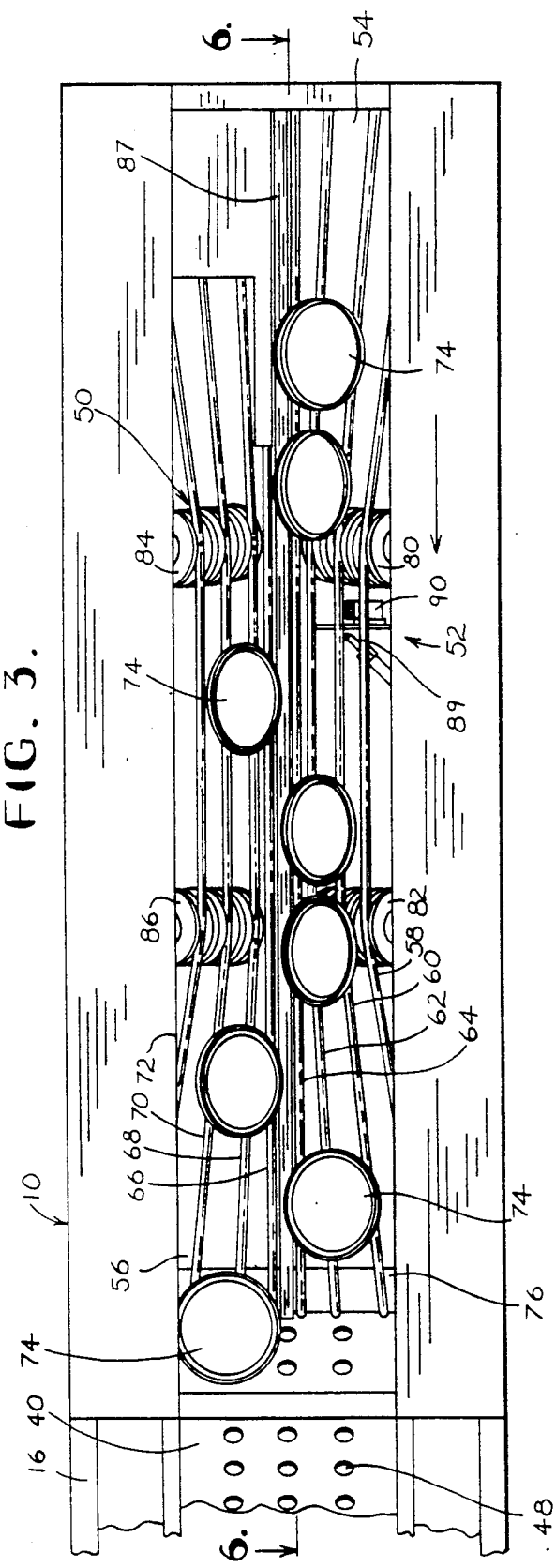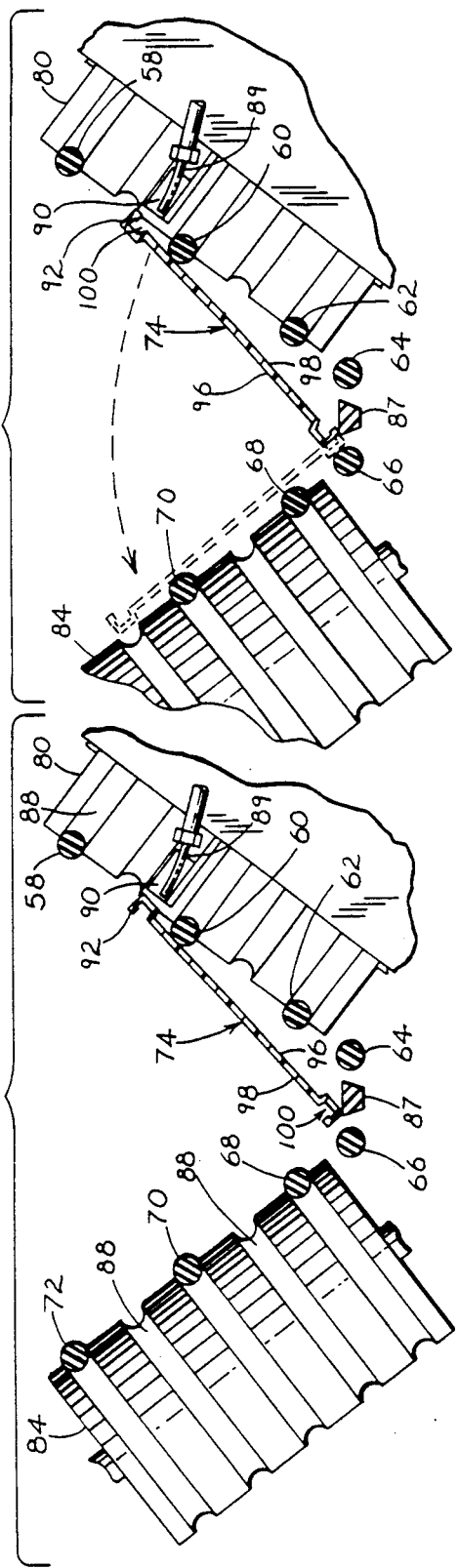

LID ORIENTING MACHINE

BACKGROUND OF THE INVENTION

1. Field of the Invention

This invention concerns a unique apparatus for orienting lids other objects having two discrete sides whereby the sides may be oriented into the same direction. More particularly, it is concerned with an orienting apparatus having a plurality of belts which enable the lids to be presented in a first angle of inclination prior to application of a shifting force such as an air jet to shift misoriented lids to an alternate inclination and thereafter all deliver the lids to a discharge end in a substantially flat, common orientation.

2. Description of the Prior Art

In the manufacturing of a variety of injection-molded synthetic resin articles, such as thin plastic packaging operation for ultimate delivery to the consumer. During this operation it is essential that the lids be provided in a common orientation for purposes of counting and effective packaging.

Various methods of separating and individually delivering molded plastic lids have been devised over the years; such as machines operating on a centrifugal force basis and various other mechanical devices. Many of these devices have been fully satisfactory and functioning to separate a group of lids which are in a scrambled or stacked relationship in order to deliver them in an oriented condition and deposit them on a stacking unit. One such device which has proved capable for efficient and effective handling of these article is disclosed in U.S. Pat. No. 4,711,338. Unfortunately, ever-increasing production volumes have led to a need for a device which can handle an even greater volume of lids and orient them into a common direction.

SUMMARY OF THE INVENTION

The lid feeding machine herein disclosed meets the need for a high volume lid orienting apparatus by a deceptively simple operation whereby the lids are initially delivered to an inlet end in a substantially horizontal position with either the top or the bottom facing upward and thereafter conveying the lids to a discharge end. During travel, the lids are inclined and those lids requiring orientation are shifted to an alternate orientation by a shifting apparatus such as an air jet. This air jet essentially flips the lid to an alternate, opposing angle and consequently positions either the top or the bottom of the lid in a somewhat downward orientation. Thereafter, the lids are returned to an orientation in a common, preferably horizontal plane for delivery in a common orientation.

In greater detail, the lid orienting apparatus hereof includes a plurality of orienting belts movable in a common direction over and between two grooved, essentially cylindrical pulleys. One pulley is adjacent the inlet end and one pulley is adjacent the discharge end. Intermediate the inlet end and discharge end pulleys are a series of rollers which are inclined and oriented to engage the orienting belts as they move thereacross. The rollers change the cross-sectional configuration of the orienting belts to essentially a V-shaped lid supporting and conveying structure, whereby lids are delivered on one side of them "V" and lids which are misaligned are shifted to an alternate angle of repose on the opposite side of the "V" by an air jet. The air jet may be fine tuned to supply a continuous, supply of air within a narrow air velocity range, or alternately an electric eye may detect which lids are out of alignment and the air jet thereafter delivers a pulse of air to flip over the selected lids. The apparatus advantageously employs a descrambler adjacent the inlet and to deliver lids to the orienting belts individually. Adjacent the discharge end, an inclined vacuum belt conveys the lids between a pair of centering paddles to align the now-oriented lids into a straight row.

In particular preferred forms, the descrambler adjacent the inlet end includes a revolving disk to move the scrambled lids delivered thereon radially outwardly. A wall surrounds the disk, but an opening is provided adjacent the input of the orienting belts for delivering single lids onto the orienting belts themselves.

Adjacent the outlet end, an inclined belt is provided with a vacuum for holding the lids thereon as they pass between the centering paddles so that the lids are held thereon when delivered in an aligned orientation to a stacker or other receiving apparatus.

BRIEF DESCRIPTION OF THE DRAWINGS

FIG. 1 is a front elevational view of the orienting apparatus of the present invention with the descrambler shown at the right side and the inclined vacuum belt at the left end thereof;

FIG. 2 is a top plan view of the orienting apparatus hereof showing the orienting belts intermediate the descrambler and the inclined vacuum belt;

FIG. 3 is an enlarged, fragmentary top plan view showing the orienting belts stretched over pulleys and rollers for conveying a plurality of lids therealong, and also showing an electric eye and air jet nozzle for shifting misoriented lids to an alternate angle of repose;

FIG. 4 is a fragmentary section view through the orienting belts and rollers showing a properly oriented lid conveyed by the orienting belts past the air jet nozzle and electric eye;

FIG. 5 is a view similar to FIG. 4 showing a lid in an undesired orientation with an arrow in phantom illustrating the shifting movement of the lid upon engagement with the air jet delivered from the nozzle to a desired alternate angle of repose as shown in phantom, the lid thereafter resting against an opposing orienting belt.

DESCRIPTION OF THE PREFERRED EMBODIMENT

Figure 6:
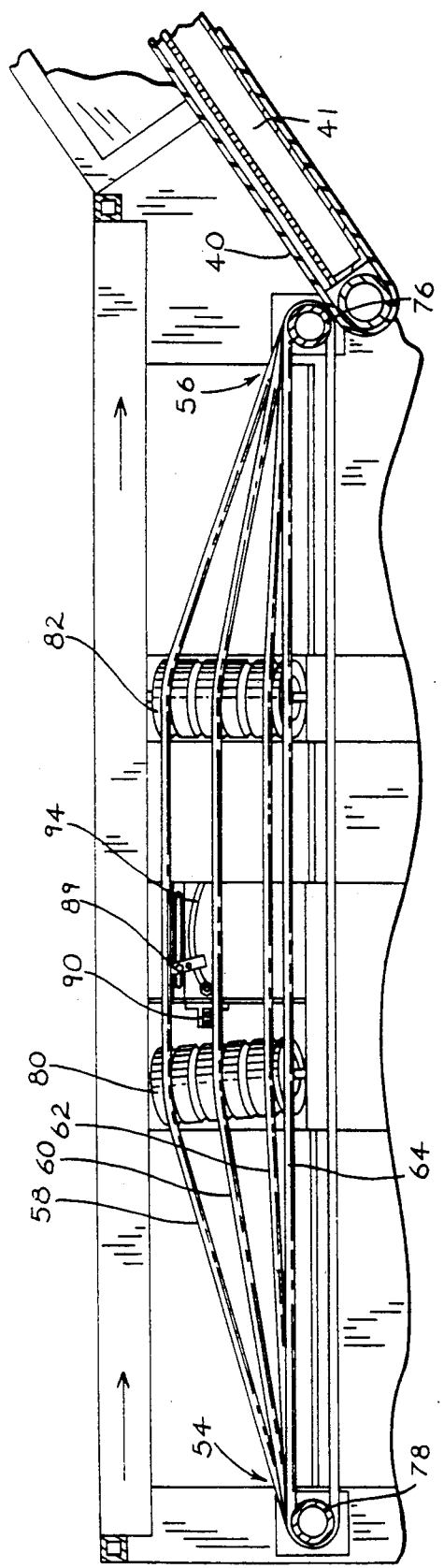
FIG. 6 is a cross-sectional view taken along line 6—6 of FIG. 3 showing the position of one row of orienting belts and the location of the electric eye and air jet nozzle of the apparatus hereof.

Referring now to the drawing, and in particular FIGS. 1 and 2 thereof, a lid orienting machine 10 broadly includes a descrambler 12, an orienter 14 and an aligner 16. The descrambler 12, orienter 14 and aligner 16 are sequentially ordered so that lids 74 initially received in descrambler 12 are delivered to orienter 14 and then to aligner 16 for ultimate delivery to a stacking mechanism for collecting and boxing the lids 74 which have been oriented or other apparatus which would receive the lids for other operations.

In greater detail, descrambler 12 includes a rotating disk 18 powered by a suitable prime over through a reduction gear box or a series of belts. The rotating disk 18 is surrounded by a wall 20 which maintains the lids deposited on rotating disk 18 and prevents them from escaping except through slotted portion 22 of wall 20 which includes a slot 23 shown in phantom on FIG. 2 adjacent the rotating disk 18. The slot 23 is of sufficient height to enable a single lid to pass therethrough. A pair of bouncers 24 and a baffle 26 serve to separate multiply connected lids which are bound together while carried on rotating disk 18.

A chute 28 is defined on descrambler 12 downstream from slotted portion 22 between guide 30 and forwarding belt 32. A metering belt 32 is driven by rotor 34 in a clockwise direction as shown in FIG. 2 to receive lids passing through slotted portion 22 and first slow the velocity of the lids thrown off the disk 18 to better space them along the orienter 14. Once slowed, the lids 74 are then urged in a downstream direction toward orienter 14. A retainer 36 including a plurality of spaced, interconnected bars is spaced above chute 28 to maintain lids 74 flat during engagement with belt 32. Retainer 36 is pivotally mounted on arm 38 to provide adjustability according to the diameter of the lids 74 and the position of the belt 32.

Located downstream from orienter 14 is aligner 16 which includes an inclined, perforate conveyor belt 40. Conveyor belt 40 is normally in communication with a vacuum chamber 41 located therebeneath so that lids deposited on the conveyor belt 40 from the orienter 14 are retained thereon during their upward passage. In addition, a pair of spaced apart, opposing inwardly angled centering bars 42 and 44 are positioned to engage and center lids moving upwardly on belt 40. Centering bars 42 and 44 are normally adjustably mounted on brackets 46 whereby lids of different diameters may be accommodated and appropriately centered by the centering bars. A vacuum apparatus located beneath the conveyor belt 40 serves to draw air through vacuum chamber 41 and through the perforations, and when the lids block the perforations 48, they are held thereagainst during travel upwardly along aligner 16. After passage along conveyor belt 40, the oriented and aligned lids are deposited upon stacking apparatus or other packaging means for collecting the oriented lids and placing them in appropriate containers, or received by other apparatus for further handling.

Referring now to FIG. 3, the orienter 14 includes a conveying structure 50 and shifting apparatus 52. Orienter 50 presents an inlet end 54 and a discharge end 56. A plurality of orienting belts 58, 60, 62, 64, 66, 68, 70 and 72 are arrayed in spaced, substantially parallel relationship transversely across orienter 14 and are driven by pulleys 76 and 78 (shown in FIG. 6) to convey lids 74 in a downstream direction from inlet end 54 to discharge end 56. Cylindrical pulleys 76 and 78 are connected to an electric motor or other suitable prime mover by belts, shafts or drive chains to rotate belts in a generally clockwise direction as shown in FIG. 6.

Belts 58, 60, 62 and 64 comprise a first set of orienting belts which are driven by pulleys 76 and 78 over rollers 80 and 82 while belts 66, 68, 70 and 72 comprise a second set of orienting belts driven over rollers 84 and 86. Rollers 80, 82, 84 and 86 are all inclined so that opposing first and second sets of belts are essentially V-shaped when viewed in cross-section as shown in FIGS. 4 and 5. Rollers 80, 82, 84 and 86 are rotatable about shafts and are essentially cylindrical in configuration but include a plurality of grooves 88 thereon for receiving the appropriate orienting belts at spaced intervals according to the dimensions of the lids to be conveyed therealong. As may be seen in FIGS. 4 and 5, lids 74 are supported at an inclined angle of repose by the orienting belts during their conveyance along orienter 14. Some belts, e.g., orienting belts 58, 60 and 62 are supported and directed by roller 80 while a portion of the belts of second set including belts 68, 70 and 72 are supported and directed over roller 84. A center belt 87 as well as orienting belts 64 and 66 serve to prevent the lid 74 from slipping downwardly through orienter 14 and thus engage at least a portion of each lid 74 during its movement from inlet end 54 to discharge end 56. As may be seen in FIG. 6, at least some of the orienting belts are stretched over rollers 80 and 82 whereby they are diverted inwardly and upwardly to present the V-shaped cross-section shown in FIGS. 4 and 5. The orienting belts within each set are maintained in substantially equidistant spaced orientation. All of the orienting belts 58, 60, 62, 64, 66, 68 and 72 are initially in the same horizontal plane when stretched over cylindrical pulley 76 adjacent discharge end 56 and also when stretched over cylindrical pulley 78 adjacent inlet end 54.

Shifting apparatus 52 includes an air jet nozzle 89 which is operatively coupled to an electric eye 90. Air jet nozzle 89 is connected to a supply of compressed air in air jet to be delivered to selected lids through the nozzle 89. Electric eye 90 is oriented to detect the presence of lip 92 or other structure on lid 74. Electric eye 90 is operatively connected to the compressed air source to supply a signal to actuate the source to deliver a jet of air through nozzle 89 when the lip 92 is detected by the electric eye in, e.g., a downward oriented position as shown in FIG. 5. As may be seen in FIG. 6, the position of nozzle 89 may be varied by adjustment along track 94 to accommodate lids of various sizes.

In an alternate embodiment of the lid orienting machine 10, descrambler 12 may be replaced by descrambler 112 which may be more effective in handling lids 74 which tend to cling together. Descrambler 112 is shown in FIGS. 7 and 8 and includes a pair of rotatable concentric disks.

A flexible upper disk 114 is made of a synthetic resin material such as urethane. The upper disk 114 is provided with an uneven perimeter 116 which is wavelike in appearance when viewed from the side, as seen in FIG. 8. The perimeter undulates through a range of $\frac{1}{4}''$ to $\frac{1}{2}''$. Upper disk 114 mounted on driveshaft 118 by a hub 120, and is driven by driven belt 122 connected to large pulley 124 mounted on driveshaft 118.

A second, rotatable lower disk 126 is positioned immediately below and concentric with upper disk 114. Lower disk 126 is essentially flat, smooth and hard in contrast with the flexible, wavy upper disk 114 which is of a larger diameter than upper disk 114. Lower disk is mounted on annular shaft 128 which is driven by a drivebelt 130 connected to small pulley 132. Annular shaft 128 is thus powered independently of driveshaft 118 and is free to rotate lower disk 126 independently of upper disk 114. A circular wall 134 surrounds both upper disk 114 and lower disk 126 in close proximity to the margin of the latter to prevent lids 74 from being trapped therebetween.

Figure 7:
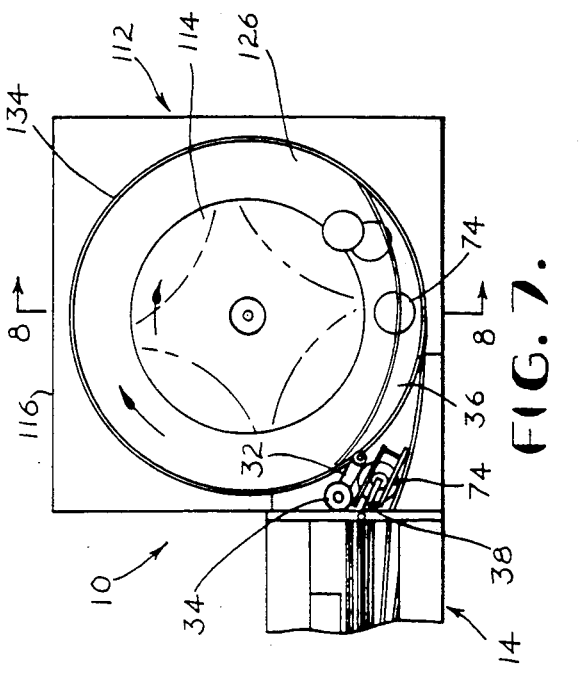
FIG. 7 is a fragmentary top plan view showing an alternate embodiment of the descrambler.
Figure 8:
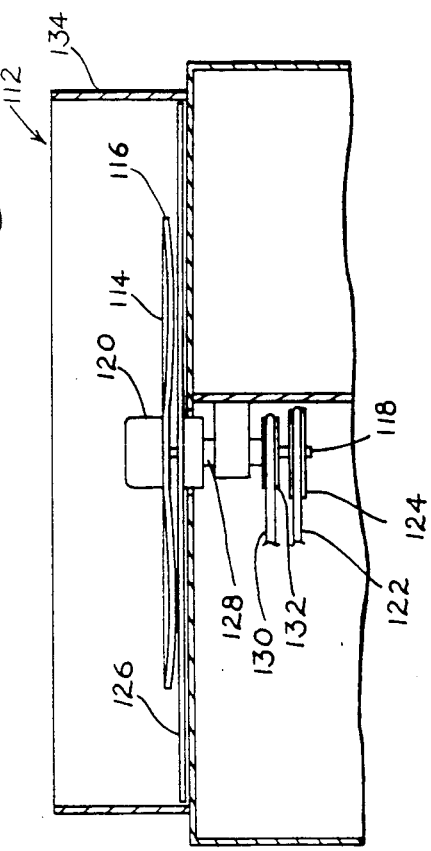
FIG. 8 is an enlarged cross-sectional view taken along 8—8 of FIG. 7.

As may be seen in FIG. 7, wall 134 is essentially circular and is provided with a slot 23 just as wall 20 in FIG. 1. Adjacent wall 134 is metering belt 32, with the remainder of the lid orienting apparatus 10 being the same as described hereinabove.

In operation, lid orienting machine 10 receives lids 74 from a molding machine onto rotating disk 18 of descrambler 12. Rotating disk 18 is rotatable in a generally clockwise direction as viewed in FIG. 2, so that the lids 74 are rotated outwardly by centrifugal force and a supply of lids eventually move in a substantially continuous manner beneath slotted portion 22 to be guided forwardly by forwarding belt 32 as directed by guide 30. The direction of rotation of the disk may be reversed depending on the location of the machine 10 and the desired path of the lids 74 downstream from the descrambler 12, that is either right-handed or left-handed operation. As the lids 74 advance over chute 28, they eventually move downwardly between shoulders 38 on slide 36 until they are delivered onto the first set of orienting belts comprising orienting belts 58, 60, 62 and 64. It is important that the lids be delivered onto only one set of the orienting belts as placement of the lids alternately between first and second sets of orienting belts would prevent the shifting apparatus from detecting and shifting certain of the lids into a common orientation.

The operation of the descrambler 112 is similar to descrambler 12 in that lids 74 are deposited thereon for descrambling and advancement to orienter 14. However, the lids 74 are deposited within wall 134 and land on either lower disk 126 or upper disk 114. Lower disk 126, by virtue of being driven by small pulley 132, rotates more slowly than upper disk 114, with both disks 114 and 126 rotating co-axially in the same direction. As a result, upper disk 114 engages the upper of two adjacent lids 74 which are undesirably stuck or nested together. The relative movement between the two disks 114 and 126 serves to thus separate the nested lids 74.

The wavy perimeter 116 of upper disk 114 ensures engagement with some part of a nested lid 74 and buffets the lids 74 within the descrambler 112 to provide more efficient separation. The rotation of the lower disk 114 and the effects of gravity cause the lids 74 within the descrambler 112 to be urged outwardly until they contact wall 134 and fall down to a horizontal orientation which is most stable for them. Now separated, they pass through slot 23 and thence downstream along slide 36 and onto orienter 14.

As the lids 74 are delivered onto first set of belts comprising orienting belts 58, 60, 62 and 64, each lid 74 is moved from a horizontal position to a first substantially inclined angle of repose, best seen in FIG. 4. It may be understood that each lid 74 is provided with top side 96 and bottom side 98. The bottom side 98 is generally provided with a circumscribing channel 100. As the lids 74 are deposited on the first set of belts including orienting belts 58, 60, 62 and 64, they are moved from the substantially horizontal orientation to an inclined angle of repose.

Thereafter, as each lid 74 passes electric eye 90 of shifting apparatus 52, the electric eye detects the presence of a downwardly oriented lip 92 on misoriented lids 74. If no lip 92 is detected, no signal is given and nozzle 89 does not discharge jet of air. Thus, the lid passes in a downstream direction towards discharge end 56 as shown by lid 74 in FIG. 5.

However, if lip 92 is detected by electric eye 90, it signals the compressed air source to discharge a jet of air through nozzle 89. The air jet thereby shifts the lid 74 from a first, inclined angle of repose against the first set of belts to a second, alternate opposing angle of repose on second set of orienting belts including orientating belts 66, 68 and 70 as shown in phantom in FIG. 4. The dotted line shown in FIG. 4 represents the direction of movement of the lid 74 upon reception of a jet of air through nozzle 89. Preferably, nozzle 89 is oriented to direct a jet of air into channel 100 where lid 92 serves to trap the air therein in a further aid in shifting lid 74 from a first position to the second position shown in phantom in FIG. 5.

In an alternate mode of operation, electric eye 90 may be deactivated or omitted from the apparatus, and a continuous stream of air then is supplied by nozzle 89. In this mode of operation, the velocity and amount of air provided through nozzle 89 must be more carefully controlled in a narrow range. However, when so limited, according to the ambient conditions and the type of lid being oriented, the continuous supply of air through nozzle 89 is generally deflected by a lid having its bottom side 98 pointed upwardly as shown in FIG. 4. On the other hand, a lid having its top side 96 pointed upwardly as shown in FIG. 5 is oriented so that its downwardly pointed channel 100 captures the air jetted from nozzle 89 in channel 100, thereby causing the lid to shift to the alternate angle of repose as shown in phantom in FIG. 5.

Thereafter, the lids move in a generally downstream direction toward discharge end 56. However, the lids arrive at discharge ends with the bottom side 98 uniformly directed in a generally upward direction. As the lids reach discharge end 56, the orienting belts 58, 60, 62, 64, 66, 68, 70 and 72 are returned to a generally horizontal plane so that each lid 74 lies substantially flat and is oriented with its bottom side 98 pointing upwardly. Having thus been oriented, lids 74 are conveyed upwardly along conveyor 40 to pass between centering bars 42 and 44. The centering bars 42 and 44 urge the lid 74 inwardly into a substantially straight, aligned path. It is to be understood that conveyor 40 must move at least as fast, or alternately at somewhat greater speed than the speed of orienting belts 58–72 so that the lids deposited upon conveyor 40 do not bunch up during centering by the passage between centering occasioned bars 42 and 44. After passage through centering bars 42 and 44, the lids 74 are both oriented and aligned and ready for delivery to a stacking apparatus or other device.

Having described the preferred embodiment of our invention, it is to be understood that the scope of the invention is only to be determined by the claim set forth hereinafter.

We claim:

1. An apparatus for descrambling lids comprising:
   a first rotatable lid-receiving surface;
   a second rotatable lid-receiving surface superposed relative to said first lid-receiving surface and rotatable about a common axis;
   a wall surrounding said first and second lid-receiving surfaces and presenting a slot for the passage of individual lids therethrough; and
   means for rotating said first and second lid-receiving surfaces in a common direction at different speeds.

2. An apparatus for descrambling lids as set forth in claim 1 wherein said second lid-receiving surface is substantially flexible and resilient.

3. An apparatus for descrambling lids as set forth in claim 2 wherein said second lid-receiving surface presents a perimeter of uneven height relative to said first lid-receiving surface.

4. An apparatus for descrambling lids as set forth in claim 2 wherein said second lid-receiving surface is of a synthetic resin material.

5. An apparatus for descrambling lids as set forth in claim 1 including metering means located downstream from said slot for metering the passage of lids thereby.

6. An apparatus for descrambling lids as set forth in claim 5 wherein said metering means includes a lid-engaging rotatable member for individually advancing said lids downstream.

* * * * *